United States Patent [19]

Donabin et al.

[11] 4,042,807
[45] Aug. 16, 1977

[54] APPARATUS FOR THE PROCESSING OF DOCUMENTS

[75] Inventors: Claude Jules Donabin, Angers; Denis L. J. G. Mercier, St. Georges, Loire, both of France

[73] Assignee: Compagnie Honeywell Bull, Paris, France

[21] Appl. No.: 631,998

[22] Filed: Nov. 14, 1975

[30] Foreign Application Priority Data

Nov. 12, 1974 France .............................. 74.40830

[51] Int. Cl.² ...................... G06K 1/12; G06K 13/00; B65H 3/44
[52] U.S. Cl. .................... 235/61.11 R; 235/61.7 B; 271/9
[58] Field of Search ............... 235/61.11 R, 61.11 D, 235/61.7 R, 61.11 B; 271/9, 257, 259, 3, 3.1, 4, DIG. 9; 209/DIG. 1, 74 M; 340/146.3; 360/88; 234/34

[56] References Cited

U.S. PATENT DOCUMENTS

| | | | |
|---|---|---|---|
| 2,053,067 | 9/1936 | Cunningham | 234/34 |
| 2,990,957 | 7/1961 | Sarley | 235/61.7 R |
| 3,304,080 | 2/1967 | Greenblott | 271/9 |
| 3,499,710 | 3/1970 | Sahley | 271/4 |
| 3,588,379 | 6/1971 | Young | 235/61.11 R |
| 3,629,556 | 12/1971 | Orzechowski | 235/61.11 B |
| 3,821,519 | 6/1974 | Pietenpol | 235/61.11 D |

*Primary Examiner*—Robert M. Kilgore
*Attorney, Agent, or Firm*—Lowe, King, Price & Markva

[57] ABSTRACT

A document handling apparatus permitting simultaneous use by two operators comprises first and second stations located at opposite ends of a common document reader. Documents are supplied to the reader via a conveyor belt from either station, but reading of the document is effected only as the documents move from the first station to the second. When a document to be read is applied to the apparatus at the first station, the document is moved, via the conveyor belt, to the reader and then returned to the first station. On the other hand, when the document to be read is applied to the apparatus at the second station, the document is moved toward the first station beyond the reader, and then moved back toward the station. As the document passes the reader, the data recorded on the document are read. Means are included for recording data on the document, and then reading the document to detect any recording errors.

8 Claims, 10 Drawing Figures

APPARATUS FOR THE PROCESSING OF DOCUMENTS

BACKGROUND OF THE INVENTION

The present invention relates to an apparatus for handling rectangular documents and more particularly to a handling apparatus of the type in which each document is subjected either to an operation involving reading information carried by the document, or recording information on the document generally followed by a reading operation to detect any possible recording mistakes.

Document handling apparatus are often used in business establishments, such as banks or agencies, having a number of branches. One or more units of the apparatus are connected to a central computer which may be located a long distance from the branch. The documents handled by the apparatus may be cards, on or in which marks or perforations are made, cheques or money orders, on which characters are printed, or similar documents. The information carried by these documents may be analyzed automatically by optical, magnetic or other means.

In one apparatus of this type, such as that described for example in U.S. Pat. Application No. 796,320, filed Jan. 31, 1969, documents are hand fed into the apparatus one after another. Each document to be read is moved lengthwise in one direction, and then possibly in the opposite direction, so that all or part of the information recorded on the document may be read and reread. After being read, the document is moved in the opposite direction from that in which it was infed and is ejected from the apparatus.

Although, such apparatus is entirely satisfactory when used by a single operator, the apparatus becomes unsuitable for simultaneous use by two operators. For example, assuming that there is only one point on the apparatus where documents are infed and ejected documents received, and that the amount of room each operator requires to do his job prevents two operators from being seated near this point in comfort, each operator is therefore obliged to shift part of his body each time he requires access to this point to feed a document into the apparatus or to receive an ejected document. Further, after an operator has moved up to feed a document into the apparatus, he is obliged to wait because there is already another document inside the apparatus. The result is not only a considerable waste of the operator's time due to repeated waiting, but also additional waste of time and fatigue caused by movements and steps which the operator has to make to gain access to the apparatus.

OBJECTS OF THE INVENTION

One object of the present invention is to provide a new and improved document handling apparatus which substantially reduces or overcomes the above drawbacks.

Another object of the present invention is to provide a document handling apparatus which is robust, inexpensive, and which, while still relatively small in size, may easily be used by two operators working simultaneously, use of the apparatus being thus shared between the two operators.

Another object of the present invention is to provide a new and improved apparatus usable (simultaneously) by two operators for handling rectangular documents, comprising a reading device and a station located at each end of the reading device for infeeding and receiving documents.

SUMMARY OF THE INVENTION

In accordance with the invention, a conveyor mechanism transports a document between first and second stations so that the document passes under a reading device which reads information carried by the document only when the document is moved in a direction from the first station to the second. A first feed controlling means, coupled to the conveyor mechanism, causes the document to be fed continuously from the first station to the second, and second feed controlling means, also coupled to the conveyor mechanism, causes the document to be fed continuously from the second station to the first. First and second triggering members associated respectively with the first and second stations, generate excitation signals to the first and second feed-controlling means. A detector, situated along the path of the document at the location of the reading device generates a control signal as the document passes under the reading device. Change over means are connected to the feed-controlled means, the triggering members and the detector. Following receipt of an excitation signal emitted by one of the triggering members, and in response to an output from the detector, the change over means transmit a control signal to deactivate the feed-controlling means associated with said one triggering member to halt the movement of the document. The change over means also transmits a control signal to the feed-controlling means associated with the other trippering member to return the document to the station into which it was originally placed.

Still other objects and advantages of the present invention will be readily apparent to those skilled in this art from the following detailed description, wherein I have shown and described only the preferred embodiments of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

BRIEF DESCRIPTION OF THE DRAWING

FIG. 2 is a schematic perspective view showing an embodiment of the drive mechanism of the handling apparatus;

FIG. 3 shows how FIGS. 3A to 3F are combined; and

DETAILED DESCRIPTION OF THE PREFERRED EMBODIMENT

Figure 1:
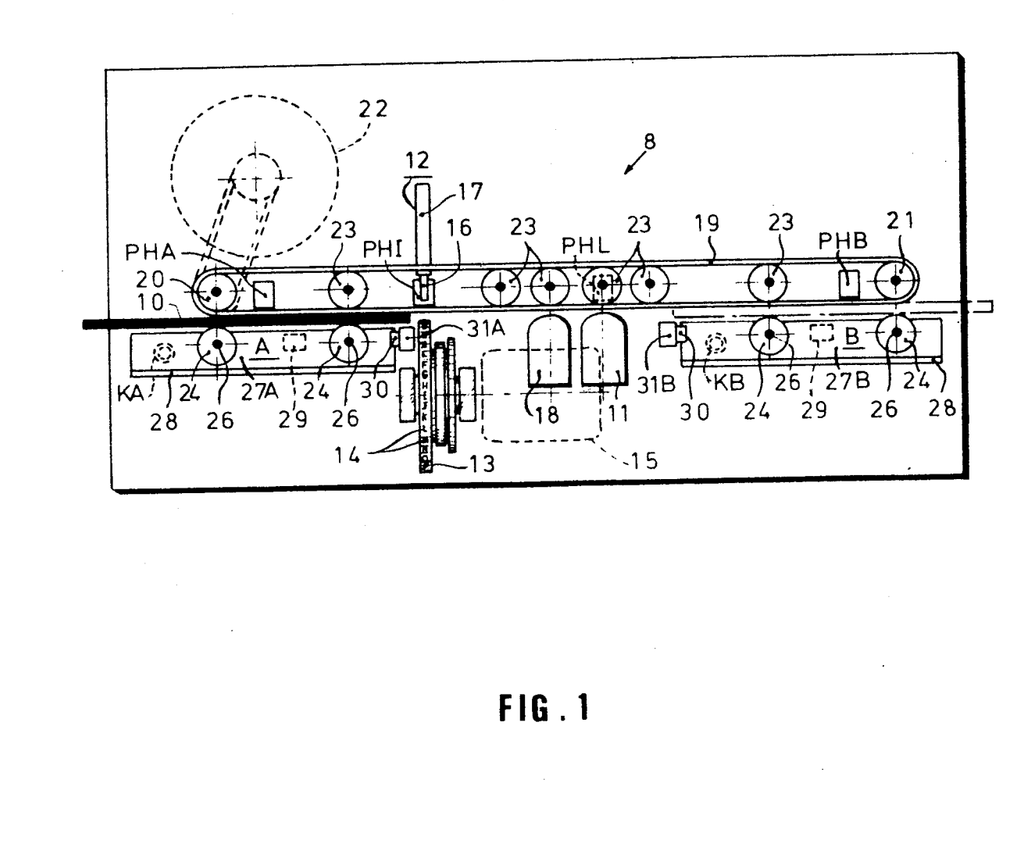
FIG. 1 is a schematic view intended to show the principal mechanical components in a document-handling apparatus constructed in accordance with the present invention.

Referring to FIG. 1, an apparatus for printing and reading rectangular documents such as cards, cheques, money orders or similar documents, in accordance with the present invention, comprises a conveyor mechanism 8, described in detail below, which allows a document 10 to be fed along a straight path, normally referred to as a "track", passing under a reading device 11 for analysing the information carried by document 10. Two stations A and B are arranged respectively at each of the two ends of this track so that document 10 may be either placed in the apparatus or extracted therefrom. The apparatus also includes a recording device 12 such as a printing device arranged between the first station A and the reading device 11. Device 12 comprises a disc 13 which carries printing characters 14 in relief on its periphery, dics 13 being rotated continuously by an electric motor 15 adjacent a strike hammer 16. Hammer 16 is actuated at predetermined times by an actuating device 17 so as so press the document 10, after it has first been brought to the printing position between disc 13 and hammer 16, against selected printing characters. Ink is provided by a conventional inked ribbon (not shown) which is situated between disc 13 and the document 10 when a selected character on the disc is in the printing position. In the preferred embodiment, the ink used for printing is a magnetizable ink with the characters printed with the ink being identifiable by a conventional automatic recognition device. The recognition device (not shown in FIG. 1 for simplicity) is normally connected to the reading device 11 to receive the signals generated by the reading device when the characters to be read pass in front of it. However, these signals can only be produced if the ink forming the characters to be read has been magnetized before passing under the reading device 11.

The magnetizing operation is performed by passing the characters under a known of magnetizing member 18, for example of the electromagnetic type, which in the preferred embodiment, is arranged between printing disc 13 and reading device 11. It will be seen that under these conditions, characters which have been printed on a document inserted in the apparatus can only be read when the document is moved in a direction running from station A to station B, with the characters to be read first being magnetized as they pass member 18 and then being demagnetized as they pass reading device 11. Nevertheless, it should be mentioned that the invention is not limited to the particular printing and reading devices described. For example, it is apparent that the printing device, depending on the particular conditions and applications, could be replaced by any other device for recording information, e.g., a card puncher. Similarly, the reading device 11 which, in the preferred embodiment, employs a magnetic process to analyze the characters carried by a document, could be replaced by any other suitable reading device, such as a brush-strip, the individual brushes of which examine the perforations made in a document electrically, or by an optical reading device for analyzing the perforations or marks carried by a document. It should also be mentioned that, in the event of such a replacement being made, member 18 no longer serves any purpose and may be omitted.

Still referring to FIG. 1, the conveyor mechanism 8, in accordance with the present invention, comprises an endless belt 19 tensioned between two rollers 20 and 21, with roller 20 mechanically coupled to a drive motor 22. To prevent document 10 from slipping on belt 19, conveyor mechanism 8 also comprises intermediate rollers 23 and pressure rollers 24, two of the pressure rollers being arranged at right angles to rollers 20 and 21. The distribution of the other pressure rollers, the intermediate rollers 23 and the reading device 11 is such that a document 10 which has been inserted in the apparatus is at all times pressed against belt 19. The pressure rollers which are arranged along stations A and B may, however, be urged away from belt 19 to allow a document to be inserted in the apparatus and withdrawn from it. To this end, the pressure roller are mounted on shafts 26 which are attached to each of two support blocks 27A and 27B associated with stations A and B respectively, each support block pivoting about a hinge 28 secured to the apparatus; hinge 28 is arranged so that it includes a horizontally disposed longitudinal axis running in the same direction as the movement of documents, whereby support blocks 27A and 27B pivot away from belt 19 toward a viewer of FIG. 1.

A pressing spring 29 is fitted under each support block 27A, 27B to swing each block, about hinge 28, so as to move pressure rollers 24, carried by the support block, away from belt 19. The pressure rollers are, however, brought back into the position shown in FIG. 1 to pressure a document against belt 19 by applying manual pressure against the support block. The pressure rollers 24 are held in the illustrated position by a locking catch 30, one of which is provided at each of stations A and B. As each of catches 30 is pushed back by corresponding support block 27A or 27B when the latter is lowered, the catch moves aside, and then comes back into position to prevent the corresponding support block from rising again. The catch 30 is operated by an electromagnetic actuating device 31 which, when excited attracts the catch towards it. The support block 27A or 27B is then released by actuation of corresponding catch 30, to pivot away from belt 19 under the biasing of spring 29, and tilt, taking with it the pressure rollers 24 which it carries. The rollers, by moving away from belt 19, allow an operator to insert a document into the apparatus or to withdraw a document inserted previously. In FIG. 1, the electromagnetic actuating devices 31 associated with stations A and B bear reference numerals 31A and 31B respectively so that they can be distinguished from each other.

Station A and station B are also provided with electrical contact KA and KB. Contacts KA and KB are closed by the support block associated with the respective station when the support block is locked by its associated catch.

The handling apparatus shown in FIG. 1 also includes detectors PHA, PHI, PHL and PHB arranged, respectively, in the region of station A, recording device 12, reading device 11 and station B, to detect whether there is a document in one of these stations or under one of these devices. In the preferred embodiment, detectors PHA, PHI, PHL and PHB each comprise photoelectric cells which normally receive light beams emitted by light sources (not shown in the drawings) and which, in response to receiving the beams, generate an output voltage. The output voltage ceases whenever a document, passing between the cell and the light source, interrupts the beam.

Figures 2, 3:
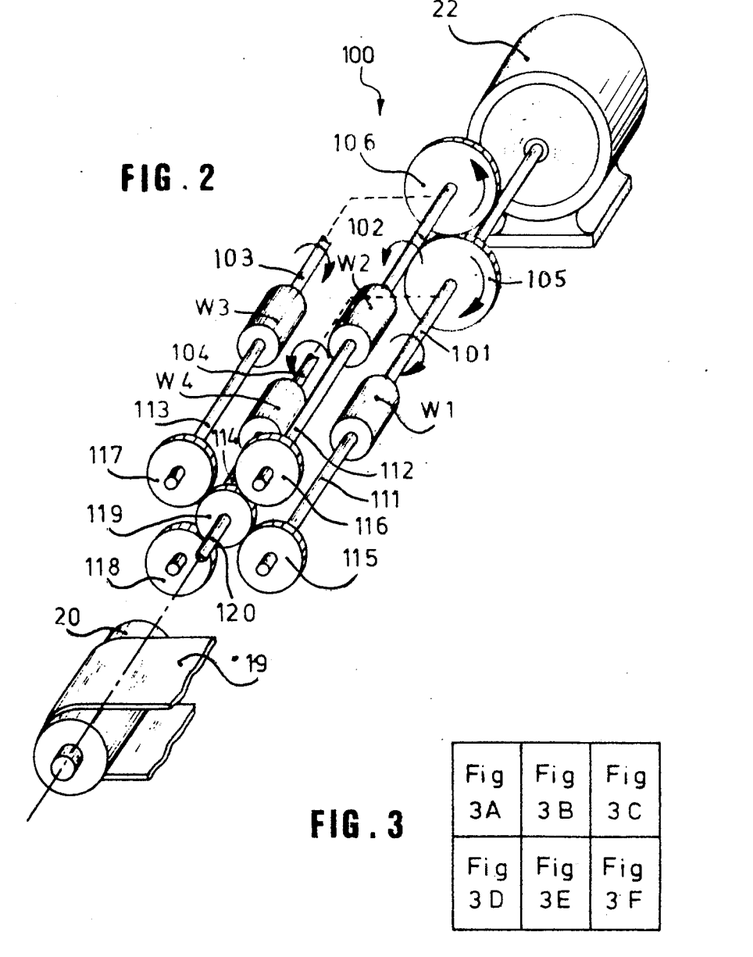

Referring now to FIG. 2, drive mechanism 100, which allows roller 20 and belt 19 mounted on the roller to be driven from electric motor 22, will be described. As can be seen in FIG. 2, drive mechanism 100 comprises a set of four main shafts 101, 102, 103, 104 wherein only shaft 101 is driven directly by motor 22 and the other three shafts are driven by motor 22 via gear wheels, two gears 105 and 106 being shown in FIG. 2 for simplicity. Shafts 102, 103 and 104 and the gear wheels are arranged such that shaft 103 rotates in the same direction as shaft 101, whereas shafts 102 and 104 rotate in the opposite direction from shaft 101.

Drive mechanism 100 further comprises a set of four secondary shafts 111, 112, 113, 114 driven by main shafts 101, 102, 103 and 104 respectively, by means of clutches W1, W2, W3 and W4. These four secondary shafts engage with shaft 120 of rollers 20 via gear wheels 115, 116, 117, 118 and 119. Clutches W1 and W2 are electromagnetic clutches of a known type, as described in U.S. Pat. No. 3,354,822 in which a continuously rotating drive shaft is provided with a cylindrical magnetic circuit. As excitation coil is housed in the body of the circuit in order to attract a friction disc locked in rotation to the shaft to be driven. Each of clutches W3 and W4 is a conventional single-turn clutch, such as the type described in U.S. Pat. No. 2,610,736 in which a continuously rotating drive shaft is fitted with a ring having a cut-out in which a pawl secured to the shaft of the mechanism to be driven is able to engage under the prompting of a spring. The pawl is normally held out of engagement with the cut-out in the ring by means of a hook which is in turn attached to the moving flap of an electromagnet. The hook is held in engagement with the pawl by the action of a spring which holds the moving flap away from the fixed armature of the electromagnet. When the electromagnet is excited, the flap is attracted thereto, stretching the spring attached to the flap, and releasing the pawl. The pawl, under the force of its own spring, is able to engage the cut-out in the ring on the drive shaft and thus set the mechanism in motion. When the excitation of the electromagnet ceases, the hook on the flap drops again whereby the pawl, as it rotates, is caught by the hook and is disengaged from the cut-out in the ring to declutch the mechanism.

Still referring to FIG. 2, it can be seen that the four secondary shafts 111, 112, 113, 114 are all driven simultaneously as soon as any one of the four clutches W1, W2, W3 and W4 is excited. To prevent the pawl of a non-excited single-turn clutch from being rotated by the corresponding secondary shaft during excitation of one of the other three clutches, the single-turn clutch is coupled to its corresponding secondary shaft via an additional electromagnetic clutch. This additional clutch (not shown in the drawings) is similar to clutches W1 and W2 and is excited only betweeen the time when the electromagnet associated with the singleturn clutch is excited and the time when the pawl of the latter clutch disengages from the cut-out in which the clutch had been engaged. The additional clutch is excited during this interval of time by a conventional hold-on or latching circuit (not shown for simplicity). It should however be mentioned that the handling apparatus shown in FIG. 1 is not to be limited to drive mechanism 100; the drive mechanism 100 could be replaced by any equivalent arrangement which drives the endless belt 19 either continuously or stepwise in each of two directions.

The handling apparatus shown in FIG. 1 is designed to operate in conjunction with two control panels and, possibly, with a central unit. Each control panel is allotted to a respective one of two operators, one of the operators taking his place in front of station A and the other taking his place in front of station B. In the embodiment described, each control panel comprises a coding keyboard intended to generate code combinations corresponding to the data to be recorded on a document, pushbuttons to bring about the various operations involved in conveying and processing the documents in the apparatus, and indicator lights to monitor the operation of the apparatus.

Referring now to FIGS. 3A to 3F (which are combined as shown in FIG. 3) the logic arrangement of the circuits used in conjunction with the control panels to control the operation of the apparatus just described will now be discussed. These circuits may be circuits belonging to the apparatus itself, preferably housed in a cabinet situated underneath the apparatus, or may form part of the internal circuitry of a central unit to which the apparatus may be connected. In the logic diagram shown in FIGS. 3A to 3F, the semi-circles containing a dot represent logic AND circuits, those containing a + represent "mixer" circuits or OR gates, and the triangles represent control circuits or switches. The switches, which are of a known type, are similar to those which are described in, inter alia, U.S. Pat. Nos. 3,293,617 and 3,276,767 which were filed by Compagnie Des Machines Bull on July 24, 1963 and Oct. 16, 1964 respectively. It will however be mentioned that each switch has two inputs. Each of the inputs marked with a dot is a gated input to which the pulses to be transmitted are applied. The other input is a gating input to which a control voltage is applied. It will also be mentioned that each switch only transmits the pulse applied to its gated input if its gating input is positive.

Figure 3A:
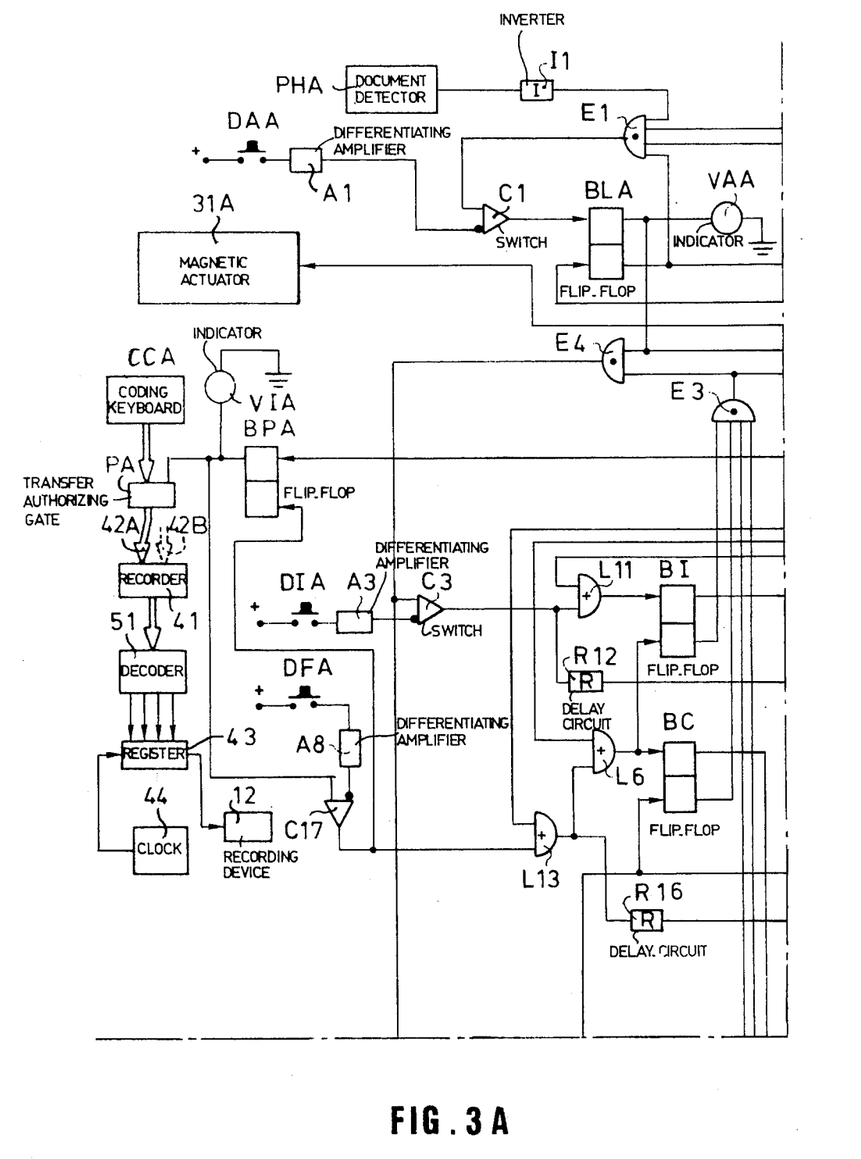
FIG. 3A to 3F in combination are a detailed logic diagram for the circuits used to control the operation of the apparatus of FIG. 1.

Also shown in FIGS. 3A to 3F are bistable elements commonly referred to as flip-flops. It will be recalled that each flip-flop, such as the flip-flops BLA which is shown in FIG. 3A has an input termed the "normal" input, an input termed the "complementary" input, a "normal" output and a "complementary" output. The flip-flop goes to, or remains in, the logic 1 state, whenever it receives a pulse at its normal input and goes to, or remains in, the logic 0 state whenever it receives a pulse at its complementary input.

The control panel for the operator whose position is in front of station A of the apparatus has a coding keyboard CCA, four pushbuttons DAA, DIA, DFA and DRA, and two indicator lights VAA and VIA. The control panel for the operator whose position is in front of station B of the apparatus similarly has a coding keyboard CCB, four press buttons DAB, DIB, DFB and DRB, and two indicator lights VAB and VIB.

It will be assumed that, at the beginning, there is no document in the apparatus and stations A and B are both open, that is to say the pressure rollers 24 at both stations are moved away from the endless belt 19. If the operator at station A for example then wishes to have data recorded on a document or to have the document read, he must first place the document in position in station A, then close the station until support block 27A is locked by the catch 30 associated with device 31A, and ask the other operator to close station B if it is still open. The effect of these operations is to close the two contacts KA and KB. In addition, because there is now a document in station A, there is no positive voltage at the output of the detector PHA, whereby the output of inverter I1 (FIG. 3A), connected to the output of PHA, is positive. Consequently, the first input of an AND circuit E1 is positive. The second input of AND circuit E1, connected to the positive terminal (+) of a voltage source 33 (FIG. 3B) via contacts KA and KB, is also at positive since these contacts are closed. The other two input of circuit E1, connected respectively, to the complementary output of a flip-flop BLB (FIG. 3C) and the complementary output of a flip-flop BLA (FIG. 3A) are also positive since the two flip-flops are initially in the logic 0 state. Since all four inputs of AND circuit E1 are positive, the output of circuit E1 is positive and makes switch C1 (FIG. 3A) conductive. Accordingly, if the operator at staion A presses pushbutton DAA, a positive voltage is applied, as shown by FIG. 3A, to the input of a differentiating amplifier A1.

Differentiating amplifier A1 generates a single pulse each time its input is made positive. This pulse, applied to the gated input of control circuit C1 which is conductive, is then transmitted by the latter, and is applied to the normal input of flip-flop BLA. The complementary output of the flip-flop thus ceases to be positive whereby no positive voltage can appear at the output of AND circuits E1 and E2 (FIGS. 3A and 3C), making control circuits C1 and C2 non-conductive. It can thus be seen that if, at some subsequent point, the operator at station B presses pushbutton DAB, the pulse which appears at the output of a differentiating amplifier A2 and fed onto control circuits C2, is blocked by the latter. Flip-flop BLB thus remains in the logic 0 state.

Figure 3B:
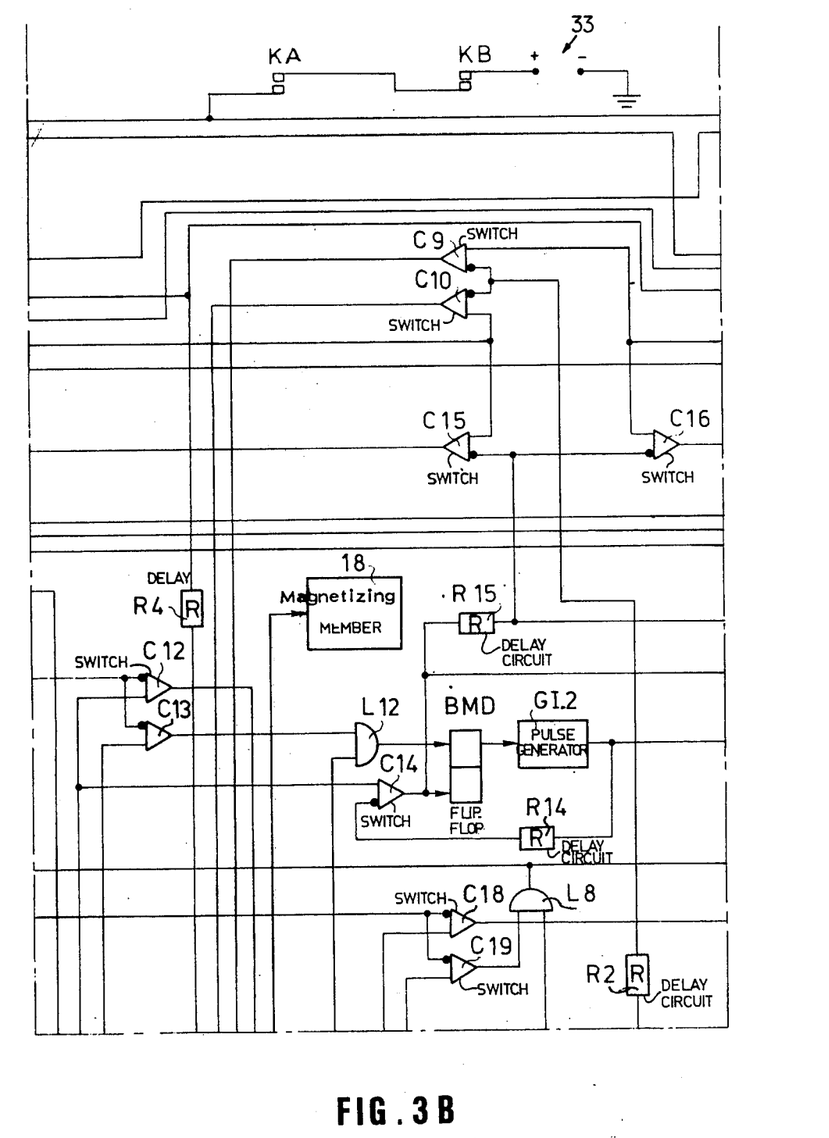
Figure 3C:
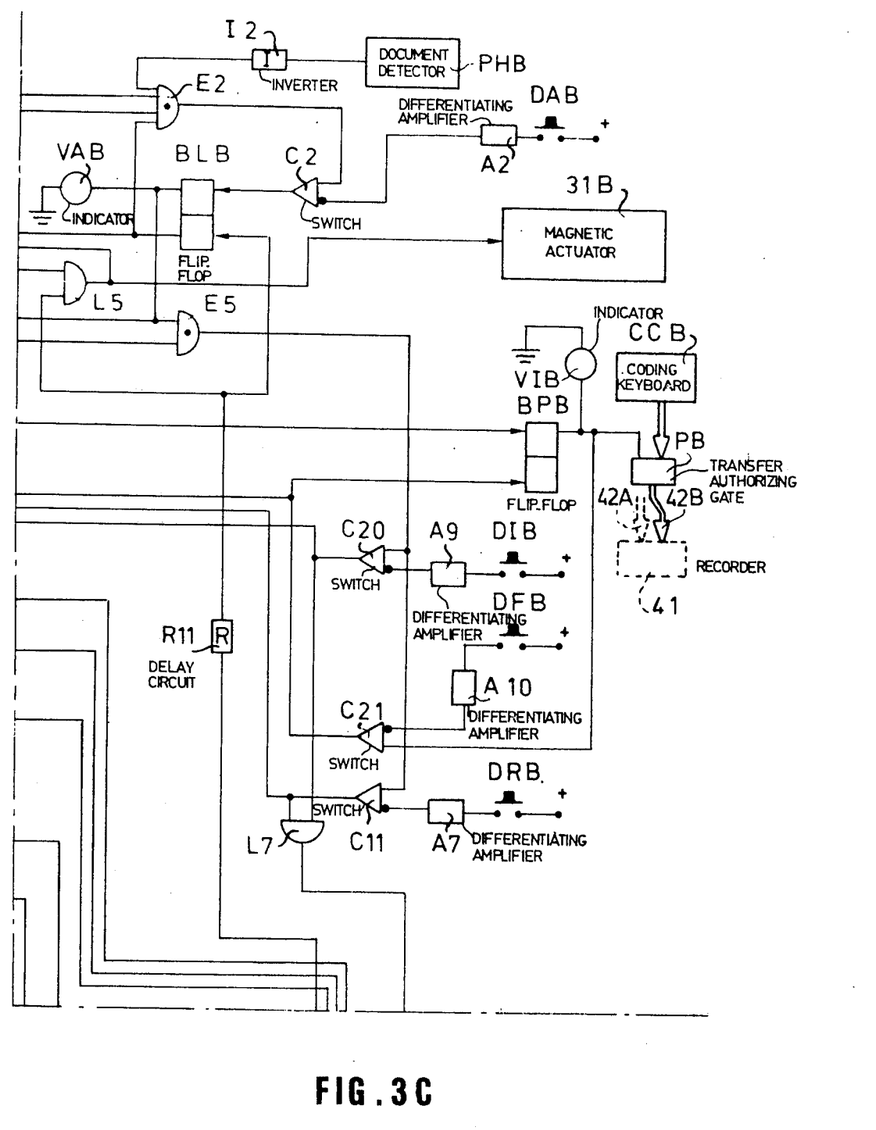
Figure 3D:
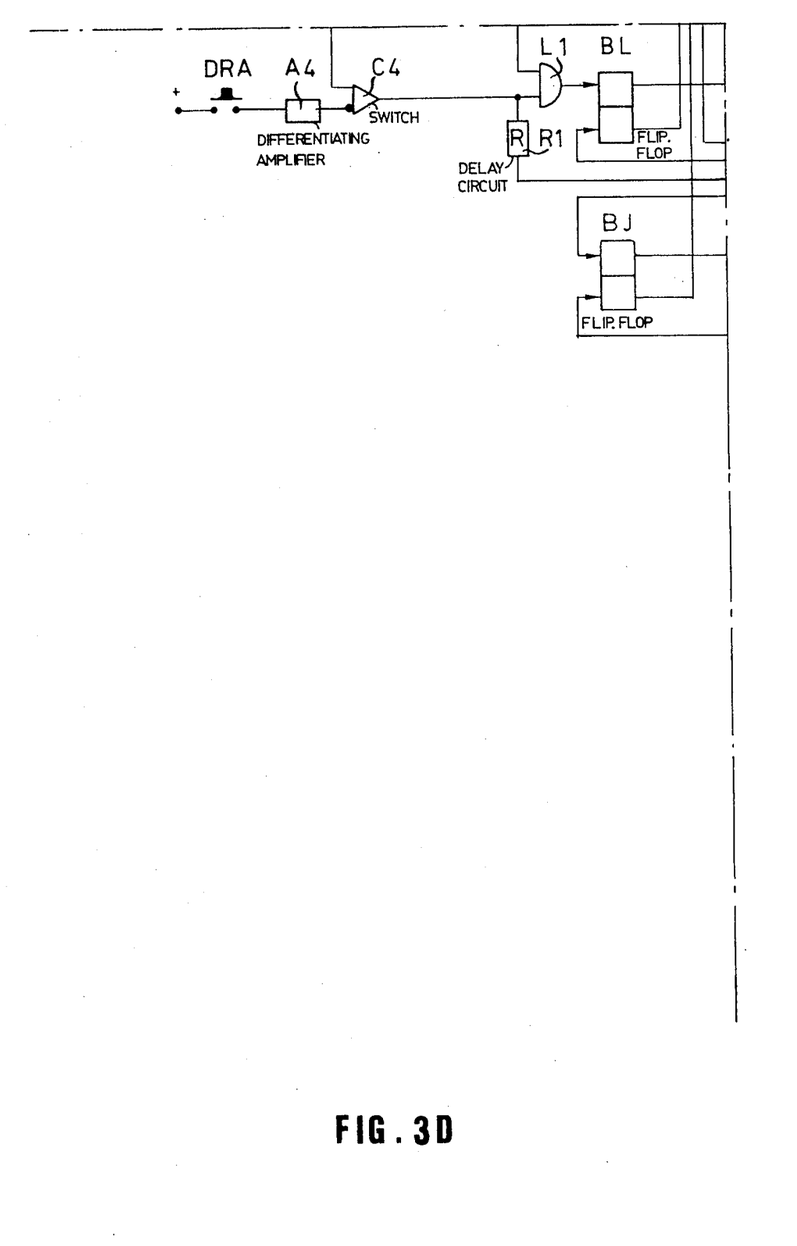

Flip-flop BLA is in the logic 1 state, the indicator VAA connected to the normal output of the flip-flop lights up. This indicates to the operator at station A that the handling apparaus is ready to move up the document, inserted at station A, either to bring the document into the recording position under recording device 12 or to pass it under reading device 11. The moving up process begins when the operator at station A depresses either pushbutton DIA, if he wishes to record data on the document, or pushbutton DRA, if he wishes the data carried by the document to be read by the apparatus. In this regard, it should be mentioned that the four flip-flops BI, BC, BL and BJ shown in FIGS. 3A and 3D are initially in the logic 0 state. The result is that the output of an AND circuit E3 (FIG. 3A), the inputs thereof being connected to the complementary outputs of these four flip-flops, is positive. AND circuit E4 has two inputs. One of the two inputs is connected to the normal output of flip-flop BLA and the other input is connected to the output of circuit E3. The output of AND circuit E4 is thus also positive, making switches C3 and C4 conductive.

Figure 3E:
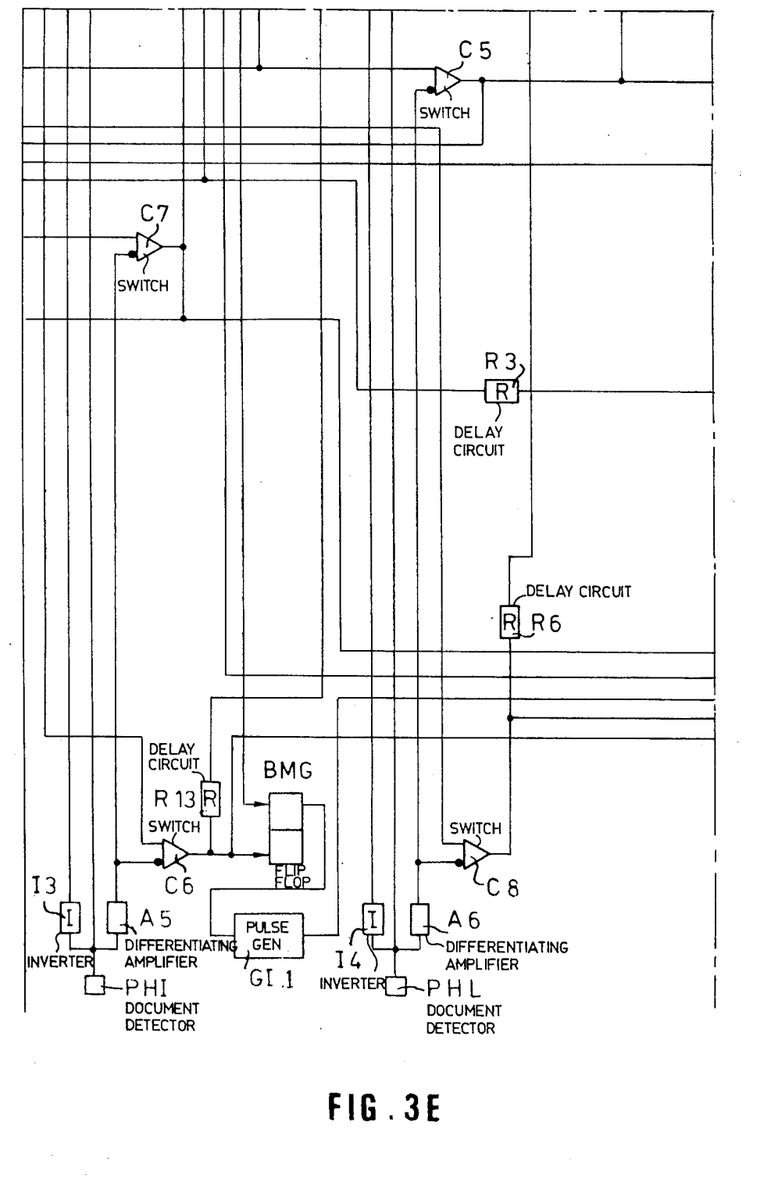

The first case considered is where an operator at station A wishes to have the data carried by the document read by the apparatus. This being the case, the operator must press pushbutton DRA following an output at indicator VAA, causing a pulse to appear at the output of a differentiating amplifier A4 (FIG. 3D). The pulse is applied to the input on a delay circuit R1 and to the normal input of flip-flop BL via OR gate L1, the flip-flop going to the logic 1 state. The positive voltage appearing at the normal output of flip-flop BL (in the logic 1 state) is applied to read-validating means (FIG. 3B) which, in the preferred embodiment, comprise the magnetizing member 18 discussed above, and to the gating input of switch C5 (FIG. 3E), making the switch conductive. The delayed pulse appearing at the output of delay circuit R1 is applied, via OR gate L2 (FIG. 3F), to the normal input of a flip-flop BRD, which thus goes to the logic 1 state. The positive voltage which appears at the normal output of this flip-flop as a result of its going to the logic 1 state is applied to electromagnetic clutch W1 discussed above. As a result of the excitation of clutch W1, roller 20 is driven by motor 22 which in turn moves belt 19 and the document toward station B. The document passes under detector PHI thereby removing the voltage at the output of the detector. As soon as the document has passed beyond detector PHI the voltage reappears and is applied to a differentiating amplifier A5, which, in response thereto, generates a pulse. This pulse is fed to two switches C6 and C7, which are in turn connected to the normal outputs of flip-flops BI and BJ respectively. Switches C6 and C7 are non-conductive because the normal outputs of flip-flops C6 and C7 are at logic 0, and thus block the pulse which is applied to them. Similarly, when the document passes under detector PHL, the voltage at the output of that detector is removed. In addition, the data carried by the document is read as the document passes under the reading device 11. As soon as the document has passed beyond detector PHL, the voltage reappearing at the output of the detector is applied to a differentiating amplifier A6, which, in response thereto, generates a pulse. This pulse is fed to a switch C8 connected to the normal output of flip-flop BC, and to switch C5. The pulse is blocked by switch C8 because flip-flop BC at logic 0, but is transmitted by switch C5 to the complementary inputs of flip-flops BL and BRD, which revert to the logic 0 state, and to the input of a delay circuit R2 (FIG. 3B). As a result of flip-flop BRD returning to the logic 0 state, clutch W1 is deactivated and thereby halts the movement of the document. The document, having progressed a little way past the reading device 11, is now on the part of the track situated between the reading device 11 and station B. Flip-flop BL having now reverted to the logic 0 state, causes control circuit C5 to be non-conductive and the read-validating means 18 no longer receives any voltage. A delayed pulse appearing at the output of delay circuit R2 is applied to two switches C9 and C10, the gating inputs of which are connected to the normal outputs of flip-flops BLB and BLA respectively, as shown in FIGS. 3A, 3B and 3C. Since flip-flop BLA is in the logic 1 state, switch C10 is conductive, whereas, since flip-flop BLB is in the logic 0 state, switch C9 is non-conductive. The result is that switch C10 transmits a pulse to the normal input of flip-flop BJ, which goes to the logic 1 state, and to the input of a delay circuit R3 (FIG. 3E). In response to flip-flop BJ going to the logic 1 state, switch C7 becomes conductive. A delayed pulse appearing at the output of delay circuit R3 is applied, via OR gate L3 (FIG. 3F), to the normal input of a flip-flop BRG, which goes to the logic 1 state. The positive voltage at the normal output of this flip-flop is applied to the electromagnetic clutch W2 mentioned above. As a result of the excitation of clutch W2, motor 22 moves belt 19, via roller 20, in a direction such that the document which has just been read is now moved toward station A. The document thus passes back under detector PHL and removes voltage from the input of differentiating amplifier A6. As soon as the document has passed beyond detector PHL the voltage appears again, causing a pulse to be emitted by differentiating amplifier A6. This pulse is fed to switches C5 and C8 which, since they are not conductive, block it. Similarly, the document, as it passes beyond detector PHI toward station A removes voltage from the input of differentiating amplifier A5. As soon as the document has passed beyond detector PHI this voltage reappears and causes differentiating amplifier A5 to emit a pulse. This pulse, which is fed to switches C6 and C7, is only transmitted by switch C7 since switch C6 is not conductive. The pulse transmitted by switch C7 is applied to the complementary input of a flip-flop BJ, which thus revert to the logic 0 state, and, via OR gate L4 (FIG. 3F), to the complementary input of a flip-flop BRG, which reverts to the logic 0 state. The pulse is also applied to the input of a delay circuit R4 (FIG. 3B). The effect of flip-flop BJ returning to the logic 0 state is to make switch C7 non-conductive. The effect of flip-flop BRG returning to the logic 0 state is to de-energize clutch W2 and thereby halt the movement of the document.

It should be mentioned that, in the preferred embodiment, the recording device 12 and the detector PHI are arranged near station A so that the document is stopped at virtually the same time as it arrives at station A. Nevertheless, were the recording device to be arranged farther from station A, the document could still be made to stop on arrival at station A by known means. For example, one means is provided by delaying the time at which flip-flop BRG was reset to zero by means of a delay circuit (not shown) arranged between OR gate L4 and switch C7, the delay applied by this circuit being such that clutch W2 is deactivated at the time the document arrives at station A.

FIGS. 3A, 3B and 3C show that the delayed pulse appearing at the output of delay circuit R4 is applied to the complementary input of flip-flop BLA, which returns to the logic 0 state, and, via OR gate L5 (FIG. 3C), to actuating devices 31A and 31B, causing both stations A and B to open. The operator at station A can then withdraw from this station the document previously placed therein. Flip-flop BLA being reset to logic zero also extinguishes indicator VAA. At this moment the handling apparatus again becomes available to deal with another document introduced either at station A or station B depending upon whether the operator handling the document is the one detailed to station A or to station B.

Figure 3F:
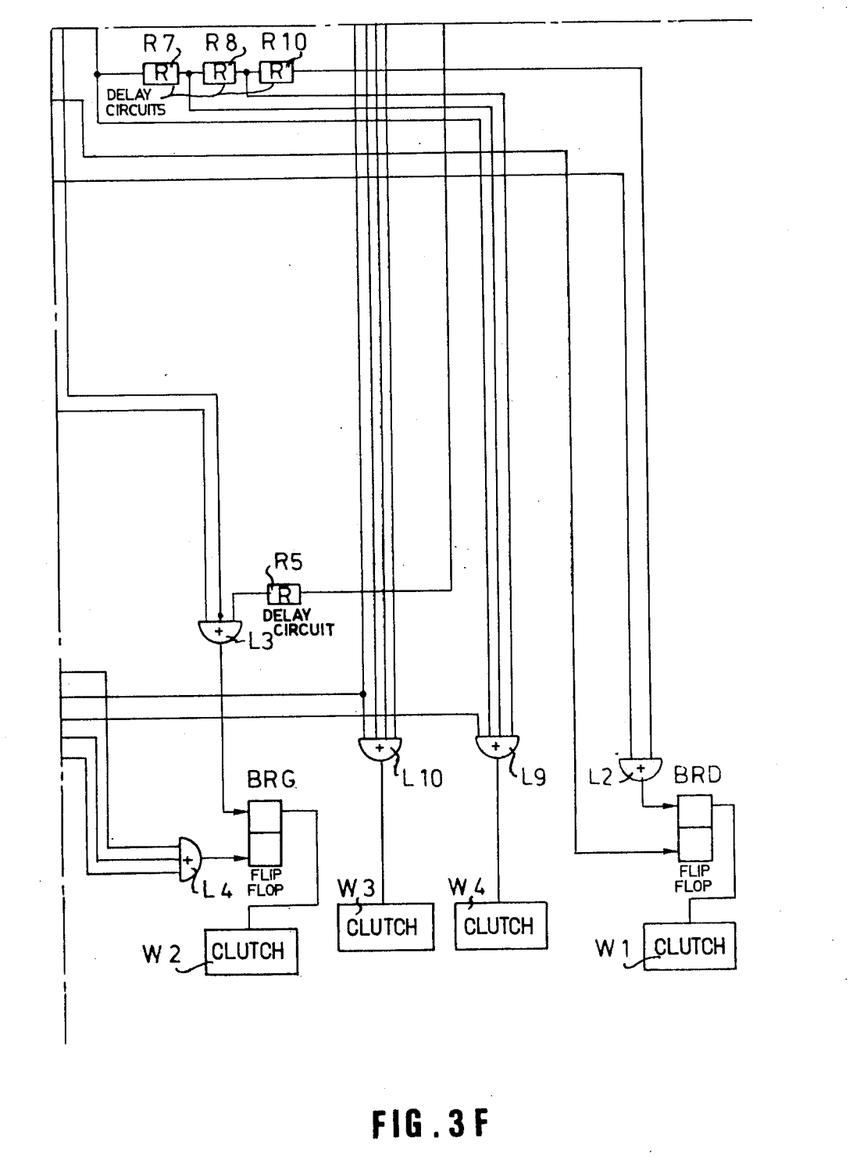

The operation of reading data on a document inserted at station B is similar to that just described, and is initiated by the operator at station B first depressing pushbutton DAB, causing flip-flop BLB to go to logic 1 and then, when indicator VAB lights, depressing pushbutton DRB. In this case, however, the effect of depressing pushbutton DRB is to apply a positive voltage to the input of a differentiating amplifier A7 (FIG. 3C) which in turn feeds a pulse to switch C11. Switch C11, which is conductive because the output of an AND circuit E5 is positive, transmits a pulse via OR gate L6 (FIG. 3A) to the normal input of flip-flop BC (which goes to the logic 1 state) and, via an OR gate L7 (FIG. 3C), to the input of a delay circuit R5 (FIG. 3F). Because flip-flop BC is now at 1, switch C8 is made conductive. The delayed pulse which then appears at the output of delay circuit R5 is applied, via OR gate L3, to the normal input of flip-flop BRG, which thus goes to logic 1. As a result of this change over, clutch W2 is excited whereby the document which has been inserted at station B is transported toward station A. The document thus passes under detector PHL and over reading device 11, but since the read-validating means 18 are not excited, the data carried by the document is not read. As soon as the document has passed under detector PHL, differentiating amplifier A6 feeds a pulse to switches C5 and C8. This pulse, which is blocked by switch C5, is transmitted by switch C8 which applies it to the input of a delay circuit R6 and, via OR gate L4, to the complementary input of flip-flop BRG, which reverts to logic 0 and de-energizes clutch W2. Accordingly, the document which has just passed over reading device 11 is halted, with the document being situated between reading device 11 and station A. The delayed pulse which then appears at the output of delay circuit R6 is applied, via OR gate L8 (FIG. 3B), to the complementary input of flip-flop BC, which reverts to logic 0, and via OR gate L1, to the normal input of flip-flop BL, which goes to logic 1, and, via a OR gate L9 (FIG. 3F), to clutch W4 which causes the document to be moved one step toward station A. The pulse transmitted by OR gate L8 is further applied to a group of delay circuits comprisng two delay circuits R7 and R8 (FIG. 3F). The delayed pulses which successively appear at the outputs of these delay circuits are applied, via OR gate L9, to clutch W4, causing the document to be moved again, this time by two steps, toward station A. Thus, after having been halted as a result of the deactivation of clutch W2, the document has been moved three steps toward station A. The object of this movement is to position the document between station A and magnetizing member 18 so that, when the document is then moved in toward station B, the data carried by it will be magnetized and can thus be read by reading device 11.

It should be pointed out that the invention is not to be limited to the means employed in the embodiment described to bring the document to this position and that the same result could be achieved by other means, e.g., by causing flip-flop BRG to be reset to zero immediately after it passes under magnetizing member 18, rather than immediately after the document passes under reading device 11. Similarly, the number of delay circuits making up the group which is used to emit the pulses which cause the stepwise movement of the document is not a limitation of the invention, this number depending on the number of steps which are necessary to bring the document into position between station A and magnetizing member 18. The group of delay circuits could even be omitted if the data carried by the document were read by a nonmagnetic method, since member 18 would serve no purpose in this case.

In the preferred embodiment, the last pulse which is transmitted to clutch W4 by the group of delay circuits R7, R8 is also applied, as shown by FIG. 3F, to the input of a delay circuit R10 so that, when the stepwise movement of the document has been completed, a pulse appears at the output of delay circuit R10 and is applied, via OR gate L2, to the normal input of flip-flop BRD. Flip-flop BRD then goes to logic 1, and with clutch W1 now excited, the document is transported toward station B. The data carried by the document is thus read as it passes under reading device 11. As soon as the document has passed under detector PHL, differentiating amplifier A6 transmits a pulse to switches C5 and C8. Because flip-flops BC and BL are in the logic 0 and logic 1 states, respectively, switch C5 is conductive and switch C8 is non-conductive. Consequently, switch C5 transmits the pulse which it receives and feeds it to the complementary inputs of flip-flops BL and BRD which revert to logic 0, and to the input of delay circuit R2. As a result of flip-flop BRD being reset to logic zero, clutch W1 is de-energized and halts movement of the document. The document, having passed a little way beyond reading device 11, is thus situated between this device and station B. As a result of flip-flop BC returning to the logic 0 state, switch C5 again becomes non-conductive and the read-validating means 18 are deprived of voltage. The delayed pulse which then appears at the output of delay circuit R2 is applied to the two switches C9 and C10. Since flip-flop BLA is in the logic 0 state, switch C10 is non-conductive whereas, since flip-flop BLB is in the logic "1" state, switch C9 is conductive. The result is that the pulse is blocked by switch C10 but is transmitted by switch C9, which applies it to the input of a delay circuit R11 (FIG. 3C) and, via OR gate L10, to clutch W3. Clutch W3 causes the document to move one step toward station B. In the preferred embodiment, in which reading device 11 and detector PHL are positioned close to station B, this one-step shift is adequate to bring the document to station B. Nevertheless, it should be pointed out that, were the distance between detector PHL and station B greater, it would be possible to shift the document up to station B by arranging a group of delay circuits at the output of switch C9 in order to obtain a series of pulses which, when applied in succession to clutch W2, would cause the document to be moved stepwise until it arrived at station B. The pulse which appears at the output of delay circuit R11 when the document has arrived at station B is applied to the complementary input of flip-flop BLB, which reverts to the logic 0 state, and, via OR gate L5, to actuating devices 31A and 31B, causing stations A and B to open. At this moment the document can be withdrawn from the apparatus by the operator at station B.

Consider now the case where the operator at station A, for example, wishes to record data on a document which has previously been inserted at station A. To be able to perform this recording operation, the operator must, as before, first depress pushbutton DAA, which, if flip-flop BLB is at logic 0, causes flip-flop BLA to change to logic 1 and indicator VAA to light-up. When indicator VAA lights up, the operator must then depress pushbutton DIA, applying a positive voltage to the input of a differentiating amplifier A3, which in turn transmits a pulse to switch C3. Switch C3, which is conductive since the output of AND circuit E4 is positive, transmits this pulse and applies it to the input of a delay circuit R12 and, via OR gate L11, to the normal input of flp-flop BI, which goes to logic 1. As a consequence, switch C6 is made conductive. The delayed pulse which then appears at the output of delay circuit R12 is applied to switches C12 and C13 (FIG. 3B), switch C12 being connected to detector PHI via an inverter I3 (FIG. 3) and switch C13 being connected to the detector directly.

Since the recording device 12 and the detector PHI are, in the preferred embodiment, arranged near station A, it may happen that a small part of the document which has been inserted at station A is under detector PHI. If this is the case, no positive voltage appears at the output of detector PHI whereby the output of inverter I3 is positive. The result is that the pulse which is applied to switches C12 and C13 is blocked by switch C13 but is transmitted by switch C12. Switch C12 applies the pulse to the normal input of a flip-flop BMG (FIG. 3E). Flip-flop BMG then goes to logic 1, exciting a pulse generator GI-1 which generates pulses as long as its input remains at positive. The pulses generated by generator GI-1 are applied via OR gate L9, to clutch W4, with each pulse causing the document to move one step toward station A. As soon as the document is clear of detector PHI as a result of this stepwise movement, differentiating amplifier A5 transmits a pulse to switches C6 and C7. This pulse, transmitted by switch C6 alone, is applied to the input of a delay circuit R13 and to the complementary inputs of flip-flops BMG and BRG, the latter remaining at logic 0 since it was there initially. The effect of flip-flop BMG reverting to logic 0 is to deactivate generator GI-1 and thus to halt the stepwise movement of the document. The delayed pulse which then appears at the output of delay circuit R13 is applied, via OR gate L12 (FIG. 3B), to the normal input of a flip-flop BMD, which goes to the logic 1 state.

Before describing the operations which follow this change of state, the same case as is described above will be considered, when no part of the document inserted at station A is under detector PHI. In this event, switch C13 is conductive and switch C12 non-conductive. The result is that the pulse which comes from the output of delay circuit R12 and which is applied to switches C12 and C13 is transmitted by switch C13 alone, which then applies it, via OR gate L12, to the normal input of flip-flop BMD. Flip-flop BMD thus goes to the logic 1 state.

The effect of flip-flop BMD going to logic 1 is to excite a pulse generator GI-2 which generates pulses for as long as its input is a positive. The pulses generated by generator GI-2 are applied to the input of a delay circuit R14 and; via OR gate L10, to clutch W3. Each pulse applied to clutch W3 causes the document to move one step in toward station B. At the moment when, as a result of this stepwise movement, the document begins to pass under detector PHI, a positive voltage appears at the output of inverter I3, causing switch C12 and a switch C14 (FIG. 3B), also connected to the output of the inverter, to be made conductive. The delayed pulse which appears at the output of delay circuit R14 at this moment and which is applied to switch C14 is therefore transmitted by the latter to the input of a delay circuit R15 and to the complementary input of flip-flop BMD, which thus returns to the logic 0 state. This pulse is also fed, via OR gate L10, to clutch W3, causing the document to be moved an additional step toward station B. The effect of flip-flop BMD returning to the logic 0 state is to deactivate pulse generator GI-2 and halt the stepwise movement of the document. However, in the preferred embodiment, when the document is stopped in this way it has not yet arrived at the so-called recording position in which the document must be situated to receive the first character to be recorded, e.g., printed. It is for this reason that the delayed pulse which appears at the output of delay circuit R15 is applied not only to switches C15 and C16 (FIG. 3B), but also, via OR gate L10, to clutch W3, which causes the document to move one step to bring it to the printing position.

It should, however, be pointed out that the invention is not to be limited to the means described to bring the document to the recording position, and that any other means could be employed which, by moving the document a predetermined number of steps, enable it to be brought to a predetermined recording position.

The switches C15 and C16 mentioned above are connected to the normal outputs of flip-flops BLA and BLB respectively. Because flip-flop BLA is at logic 1 and flip-flop BLB is at logic 0, switch C15 is conductive and switch C16 is non-conductive. The result is that the pulse applied to switches C15 and C16 is only transmitted by switch C15 to the normal input of a flip-flop BPA (FIG. 3A), flip-flop BPA going to the logic 1 state. As a result of flip-flop BPA going to logic 1, the indicator VIA which is connected to the normal output of this flip-flop lights up, and the positive voltage which appears at this output is applied to a switch C17 and to a transfer-authorizing gate PA.

The purpose of gate PA is, depending upon whether flip-flop BPA is at logic 1 or logic 0, to allow or prevent the passage of pulses generated by the coding keyboard CCA (when the keyboard is used by the operator) to an input recorder 41 via a connecting channel 42A. It should be mentioned that channel 42A is formed by a group of conductors and each character to be printed on the document is represented by a coded binary combination transmitted by the coding keyboard CCA in the form of pulses, each pulse in the combination being transmitted along an appropriate conductor in the said group. This, starting from the moment when flip-flop BPA goes to logic 1, i.e., when gate PA is made conductive, a coded combination arrives for recording in recorder 41 each time the operator at station A depresses one of the keys on keyboard CCA. This coded combination is then transmitted, via a decoder 51, to a shift register 43. Register 43, which receives pulses generated by a clock 44 in synchronization with the printing characters on disc 13, transmits a pulse to the recording device 12 when document 10 is pressed by hammer 16 against disc 13. This occurs at the moment that the printing character appropriate to the coded combination recorded in recorder 41 passing in front of the document.

For the sake of simplicity, no further details will be given of the means which, on the basis of the coded combination contained in recorder 41, enable the appropriate character to be printed on the document. In the preferred embodiment, these means are similar to those described and illustrated in a patent application which was filed by the present applicants in France on Sept. 16, 1974 as No. 74 31211. It should however be mentioned, that, as soon as the character has been printed on the document, the document is moved one step toward station B.

When all the characters which the operator at station A wishes the document to carry have been recorded thereon, the operator depresses pushbutton DFA causing a pulse to be emitted by a differentiating amplifier A8. This pulse, transmitted by switch C17 since flip-flop BPA is at logic 1, is applied to the complementary input of flip-flop BPA, which thus reverts to logic 0, and, via OR gate L13, to the input of a delay circuit R16. The pulse from OR gate L13 is also applied, via OR gate L6, to the complementary input of flip-flop BI, which thus reverts to logic 0, and to the normal input of flip-flop BC, which thus goes to logic 1. As a result, switches C17 and C6 become non-conductive, whereas switch C8 becomes conductive. Also, indicator VIA goes out and gate PA becomes non-conductive. The delayed pulse which then appears at the output of delay circuit applied to two switches C18 and C19 (FIG. 3B), switch C18 being connected to detector PHL via an inverter 14 (FIG. 3E) and circuit C19 being connected to the detector directly.

It should be mentioned that in the embodiment described the distance between the reading device 11 and the recording device 12 is less than the length of a document. This being so, it may happen that a document which has been moved stepwise toward station B as the data is being recorded will be partly under reading device 11 when the recording operation ends. In this case, no positive voltage appears at the output of detector PHL whereby the output of inverter 14 is positive and switch C18 is conductive. The result is that the pulse which is applied to switches C18 and C19 is transmitted by switch C18 alone, via OR gate L3, to the normal input of flip-flop BRG. Accordingly, flip-flop BRG goes to logic 1, energizing clutch W2 and moving the document toward station A. As soon as the document is clear of reading device 11, a pulse is emitted by differentiating amplifier A6 and is applied to switches C5 and C8. This pulse, blocked by switch C5, is transmitted by circuit C8 to the input of delay circuit R6 and, via OR gate L4, to the complementary input of flip-flop BRG, which thus reverts to logic 0. The effect of this flip-flop returning to logic 0 is to de-energize clutch W2 and to hold the document.

The operations which then take place, beginning from the moment when the delayed pulse appears at the output of delay circuit R6, are exactly the same as those which are described in detail above dealing with data read from a document which, after having been inserted at station B and moved toward station A had been stopped just after leaving reading device 11. For brevity, it will merely be mentioned that, from the moment at which the delayed pulse appears at the output of delay circuit R6, the document on which the data has been recorded is first moved three steps toward station A and then moved toward station B so as to pass under the reading device 11. The data recorded on the document is thus read to detect any possible recording errors. The document is halted immediately after it has passed under reading device 11. Thereafter, since the pulse appearing at the output of delay circuit R2 is transmitted by switch C10, the document is moved continuously toward station A and is then finally halted immediately after it passes under detector PHI, in the preferred embodiment, at practically the same time as it arrives at station A. After this, stations A and B open, allowing the operator at station A to retrieve the document.

For brevity, no detailed description will be given of the series of operations necessary to record data on a document originally inserted at station B by the operator assigned to this station. It will simply be mentioned that, in the course of these operations, beginning with the operator at station B depressing pushbuttom DIB, the document is first moved toward station A and then halted immediately after it passes under detector PHI. The document is then moved stepwise toward station B until its front edge, arriving under recording device 12, causes the voltage at the output of detector PHI to cease. At this moment the document is halted and is then moved two steps toward station B to recording position. Thereafter, flip-flop BPB goes to logic 1, which causes indicator VIB to light up and validates transfer-authorizing gate PB. The operator at station B may then, by operating coding keyboard CCB, record data on the document, the latter being moved one step toward station B as soon as each character is printed. As soon as all the characters which the operator at station B wishes to record on the document have been printed, the operator depresses pushbutton DFB. The effect, assuming that at the end of the printing operation the document is partly under the reading device 11, is to move the document continuously toward station A. The document, which is halted immediately after leaving reading device 11, is then moved three steps toward station A and then in the opposite direction so as to pass under the reading device. As soon as the document has passed under reading device 11, the document is stopped and then finally moved one step toward its original station B. After the two stations have opened, the document may finally be retrieved by the operator at station B.

Figure 4:
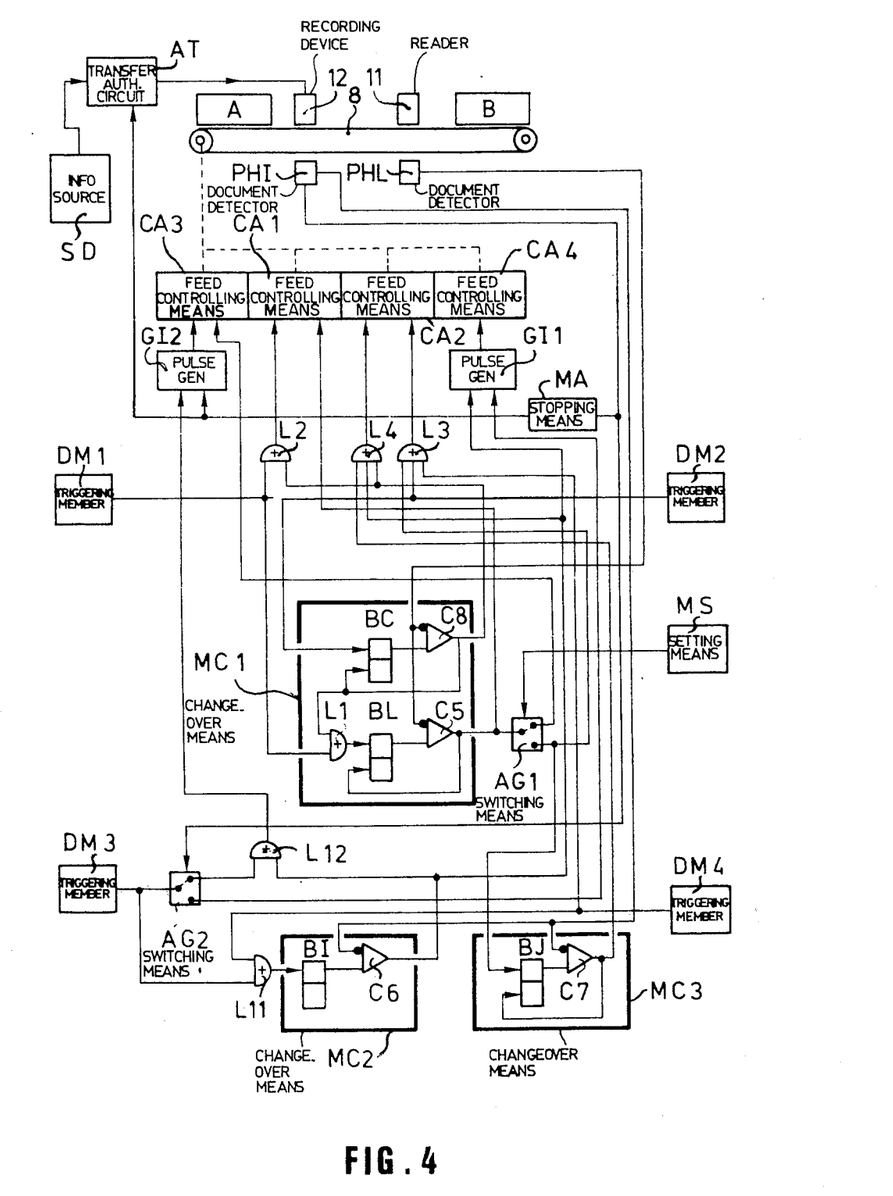
FIG. 4 is a simplified block diagram summarizing the primary components in the circuit diagram shown in FIGS. 3A to 3F.

FIG. 4 is a diagram summarizing the detailed logic diagram shown in FIGS. 3A to 3F, the main logic circuits in the detailed diagram being grouped together in the diagram in FIG. 4 so as to form functional blocks which enable the operation of the document handling apparatus to be controlled.

Also shown in FIG. 4 are the primary components of this apparatus, viz: the conveyor mechanism 8 with the endless belt, the two stations A and B, the reading device 11 and the recording device 12. The drive to the conveyor mechanism to enable it to move a document continuously in the direction of station B is provided by a first feed-controlling means CA1 comprising in the preferred embodiment, flip-flop BRD and clutch W1 discussed in detail above. Similarly, the drive to the mechanism to enable it to move a document continuously toward station A is provided by second feed-controlling means CA2, comprising in the preferred embodiment, flip-flop BRG and clutch W2.

FIG. 4 also shows a third feed-controlling means CA3 and fourth feed-controlling means CA4 which are used to control the stepwise movement of a document toward stations B and A respectively. Means CA3, which in the preferred embodiment comprise clutch W3, are connected to the output of first generator GI-2. Similarly, means CA4, which, in the preferred embodiment comprises clutch W4, are connected to the output of second generator GI-1.

The excitation of the first means CA1 is brought about by an excitation pulse produced by a first triggering member DM1 operated by the operator at station A, and transmitted via OR gate L2. Member DM1 comprises, in the preferred embodiment pushbutton DRA, differentiating amplifier A4 and the switch C4. Similarly, a second triggering member DM2, comprising pushbutton DRB, differentiating amplifier A7, and switch C11, when operated by the operator at station B causes an excitation signal to be transmitted, via OR gate l3, to the second means CA2 for controlling feed. The excitation signals which are produced by triggering members DM1 and DM2 are also applied to first change over means MC1 comprising flip-flops BC and BL, OR gate L1, and switches C5 and C8.

It should be emphasized that the connections shown in the simplified diagram in FIG. 4 are the same as those indicated in the detailed logic diagram of FIGS. 3A to 3F. The simplified logic diagram in FIG. 4 also includes second change over means MC2 and third change over means MC3, means MC2 comprising the flip-flop B1 and switch C6 in the detailed diagram, and means MC3 comprising flip-flop BJ and switch C7 in the detailed diagram.

A third triggering member DM3 comprises pushbutton DIA, differentiating amplifier A3 and switch C3, and a fourth triggering member DM4 comprises pressbutton DIB, differentiating amplifier A9 and switch C20.

First switching means AG1 in FIG. 4 comprise switches C9 and C10 in the detailed diagram. The switching means AG1 are under the control of setting means MS, which are manually operated and comprise pushbuttons DAA and DAB, differentiating amplifiers A1 and A2, switches C1 and C2 and flip-flops BLA and BLB.

Second switching means AG2, comprising switches C12 and C13 in the detailed diagram, are under the control of detector PHI so as to enable the excitation signal produced by the third triggering member DM3 to be transmitted to generator GI-2 or generator GI-1, depending upon whether or not there is a document under detector PHI.

Detector PHI in FIG. 4, is connected to stopping means MA which, in the detailed diagram, comprises inverter 13 and switch C14.

At the moment when a document, having been moved stepwise from station A, arrives under detector PHI, stopping means MA produce a signal transmitted to the first generator GI-2 to deactivate it and thus stop the movement of the document, and to transfer-authorizing circuit AT for validation.

Circuits AT, which in the detailed diagram comprise flip-flops BPS and BPB and the transfer-authorizing gates PA and PB, when validated, allow information from an information source SD to be transmitted to the recording device 12. In the detailed diagram in FIGS. 3A to 3F, information source SD is formed by the two control keyboards CCA and CCB.

The operation of the block diagram in FIG. 4 will not be described in detail since it has already been described in conjunction with FIGS. 3A to 3F. It should, however, be mentioned that the arrangement which has just been described in no way limits the invention, and that various modifications, additions or substitutions which do not exceed the scope of the invention could be made without departing from the principles of the inventions. Thus, for example, in order to avoid an operator, after having inserted a document at the station assigned to him, being obliged to ask the other operator to close the other station, it is possible to make provision for the two stations A and B to be closed by means of additional buttons which are provided on each of the control panels allotted to the two stations, either of the buttons, when pressed manually, causing both stations to close simultaneously. It should also be mentioned that, if two documents are inserted simultaneously one at station A and the other at station B, the document which is dealt with is the one from the operator who is the first to depress pushbutton DAA or DAB. In the course of operation, this document is then directed either under the recording device 12 or under the reading device 11. The other document, which is also carried along in the course of the movement of the first document, finally emerges from the apparatus and is ejected at the end of the track nearest to the station in which it was originally inserted.

It should also be noted that, although the apparatus shown in FIG. 1 incorporates a recording device 12 and a reading device 11, it would be possible, by omitting the recording device, to reduce the status of the apparatus to that of a document reader. The reading device on the other hand cannot be omitted since data recorded on the documents must subsequently be read in order to allow the detection of any possible recording errors.

What is claimed is:

1. In an apparatus for handling rectangular documents, said apparatus being of a type having a reading device, first and second stations respectively arranged at each of two ends of the reading device to contain only one document to be handled, each of said stations including means to feed in and receive said document, and a conveyor means to transport said document between said two stations so that said document passes adjacent the reading device, said reading device reading information carried by said document only when said document is moved in a direction running from the first station to the second;

first feed-controlling means coupled to said conveyor means and controlling said feed means for feeding said document continuously in a direction from the first station to the second station;

second feed-controlling means coupled to said conveyor means and controlling said feed means for feeding said document continuously in a direction from the second station to the first;

first triggering means associated with the first station and connected to said first control means for generating a first excitation signal to said first station;

second triggering means associated with the first station and connected to said first control means for generating a second excitation signal to said second station;

detector means located along a path followed by the document at said reading device for generating a control signal in response to the document passing said reading device; and change over means connected to said first and second control means, said first and second triggering means and said detector means, said change over means responsive to an excitation signal generated by one of said triggering means for directing said control signal generated by said detector means to (1) the control means associated with said one of said triggering means to halt the movement of the document, and (2) the control means associated with the other triggering means to return the document to the station into which it was originally placed.

2. A handling apparatus according to claim 1, including:
an information recording device located between said first station and said reading device, said recording device being connected, via transfer authorizing circuits, to an information source to enable, when the authorizing circuits are validated, data from the said source to be recorded on a document;

pulse generator means for generating pulses for controlling stepwise feed of the document;

third control means coupled to said conveyor means for controlling feed which, in response to an output of said generator means, cause a document situated in a section of the conveyor mechanism between said first station and said recording device to be fed one step from the first station towards the second station;

third triggering means associated with the first station and connected to the said pulse generator for transmitting an excitation signal to said pulse generator;

detecting and stopping means located at the same position as said recording device and connected to said generator means and to said authorizing circuits, said detecting and stopping means generating a signal indicating the presence of a document when a document arrives under the recording device, and transmitting said signal to (1) said pulse generator means to halt the stepwise movement of the document and (2) said transfer-authorizing circuits and thereby allow the information from the information source to be recorded on the document.

3. A handling apparatus according to claim 2, further including detection and stopping means for generating a control signal each time a document passes under the recording device, including:
fourth triggering means associated with said second station and connected to said second feed-controlling means for generating an excitation signal to said second station and said second feed-controlling means to cause a document originally placed in the second station to be moved toward the first station; and second change over means connected to said feed-controlling means, said pulse generator means, said fourth triggering means, and said detecting and stopping means, said second change over means, in response to an output signal from the said fourth triggering means, detecting the control signal generated by said detecting and stopping means to (1) said second feed-controlling means halt the movement of the said document, and (2) said pulse generator means to cause the document to be fed stepwise in an opposite direction until a front edge of said document arrives under said recording device.

4. A handling apparatus according to claim 3, further including switching means connected between said first change over means and said second and third feed-controlling means, said switching means conducting the control signal to (1) said second feed-controlling means only if an excitation signal previously received by said first change over means originated from said first triggering member, and (2) said third feed-controlling means only if an excitation signal previously received by said first change over means originated from said second triggering member, the control signals being generated by said first and second change over means as soon as a document originally received from said second station and on its way back to said second station after having passed under said reading device, has passed back under said reading device, said third feed-controlling means, in response to receiving the said control signal, causing said document to be moved stepwise, said document being halted after passing under said reading device for the second time and being returned to its original station.

5. A handling apparatus according to claim 4, wherein said recording device is located in the immediate vicinity of said first station, and further including third change over means connected to said switching means, said second feed-controlling means and to said detecting and stopping means, said third change over means, in response to said control signal transmitted by said switching means to excite said second feed-controlling means, directing the control signal generated by the detecting and stopping means to the said second feed-controlling means, thereby to deactivate said second feed-controlling means and allowing the document which has been dealt with to be halted when it returns to said first station.

6. A handling apparatus according to claim 5, further including:
second pulse generator means for generating pulses for controlling stepwise movement, said second generator means being connected to said second change over means to receive the control signal originating from said detection and stopping means and transmitted by said second change over means, said second generator being deactivated in response to receipt of said control signal;

fourth feed-controlling means coupled to said conveyor means for causing, in response to receipt of a pulse transmitted by the second generator means, a document to be moved one step from said second station to said first station; and second switching means connected between said third triggering member and said first and second pulse generator means, said second switching means controlled by said detecting and stopping means so as to receive the presence-indicating signal emitted by said detecting and stopping means and to transmit the excitation signal received from the third triggering member, either to said first generator when the said presence-indicating signal fails to arrive, or to said second generator when the presence-indicating signal does arrive, whereby if a document which has previously been inserted at the first station so as to be subjected to an information recording operation is partly under said recording device due to the fact that said recording device is near said first station, this document is, in response to the excitation signal generated by said third triggering member, firs moved stepwise toward said first station until the document is clear of the recording device, and is then moved stepwise in the opposite direction until the front edge of the document is under said recording device.

7. A handling apparatus according to claim 5 further including setting means controlled manually from either of said two stations, said setting means being connected to all of said triggering means and to said first switching means; said setting means, when actuated at the first station, preventing an excitation signal from being transmitted by said second and fourth triggering members and setting said first switching means such that the control signal which is transmitted to said first switching means is transmitted to said second feed-controlling means and said third change over means; and when said setting means are actuated at said second station, said setting means preventing excitation signals from being transmitted by said first and third triggering means and setting said first switching means such that the control signal which is transmitted to said first switching means is transmitted to said third feed-controlling means.

8. A handling apparatus according to claim 4, wherein said first change over means comprise a first bistable element normally occupying a first state and connected to said second triggering means to go to a second state when said bistable element receives an excitation signal emitted by said second triggering means; a second bistable element arranged to normally occupy a first state and connected to said first triggering member to go to a second state when said second bistable element receives an excitation signal emitted by said first triggering means; a first control circuit connected between said detector associated with said reading device and said first and second feed-controlling means, said first control circuit being under the control of said first bistable element so as, when the said first bistable element is in its second state, to transmit the control signal originating from the said detector to said first and second feed-controlling means, the signal transmitted by said first control circuit being also transmitted to said first and second elements so as to return the first bistable element to its first state and to cause the second bistable element to go to its second state; and a second control circuit connected between said detector means and said first switching means and the first feed-controlling means, said second control circuit being under the control of the second bistable element so as, when the said second bistable element is in its second state, to transmit the control signal which originates from the said detector, to said first feed-controlling means and to said first switching means, the signal transmitted by said second circuit being also transmitted to said second bistable element so as to return it to its first state.

* * * * *